United States Patent
Chen

(10) Patent No.: US 11,789,894 B2
(45) Date of Patent: Oct. 17, 2023

(54) ACCELERATION SYSTEM AND DYNAMIC CONFIGURATION METHOD THEREOF

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/720,322

(22) Filed: Apr. 14, 2022

(65) Prior Publication Data

US 2023/0237008 A1 Jul. 27, 2023

(30) Foreign Application Priority Data

Jan. 27, 2022 (TW) .................................. 111103657

(51) Int. Cl.
*G06F 15/76* (2006.01)

(52) U.S. Cl.
CPC ........ *G06F 15/76* (2013.01); *G06F 2015/763* (2013.01); *G06F 2015/768* (2013.01)

(58) Field of Classification Search
CPC ........ G06F 9/3877; G06F 15/76; G06N 3/063
See application file for complete search history.

(56) References Cited

U.S. PATENT DOCUMENTS

| | | | |
|---|---|---|---|
| 2010/0076915 A1* | 3/2010 | Xu | G06N 3/063 706/25 |
| 2018/0315158 A1* | 11/2018 | Nurvitadhi | G06N 3/063 |
| 2019/0258921 A1* | 8/2019 | Lie | G06F 13/4027 |
| 2022/0398460 A1* | 12/2022 | Dalli | G06F 18/22 |

FOREIGN PATENT DOCUMENTS

| | | |
|---|---|---|
| CN | 109923519 A | 6/2019 |
| CN | 110941494 A | 3/2020 |
| CN | 112259168 A | 1/2021 |
| CN | 109937410 B | 2/2021 |
| CN | 113887710 A | 1/2022 |
| TW | 202117551 A | 5/2021 |
| TW | 202122993 A | 6/2021 |

OTHER PUBLICATIONS

T. Kowsalya. "Area and power efficient pipelined hybrid merged adders for customized deep learning framework for FPGA implementation" Microprocessors and Microsystems 72 (Year: 2019).*
Teppei Hirotsu, Car electronics for implementing self-driving, Robot, Japan, Japan Robot Association, Nov. 20, 2016, No. 233, pp. 10-15, Nov. 20, 2016. Abstract.

\* cited by examiner

*Primary Examiner* — Jacob Petranek
(74) *Attorney, Agent, or Firm* — Winston Hsu

(57) ABSTRACT

An acceleration system includes a plurality of modules. Each of the plurality of modules includes at least one central processing unit, at least one graphics processing unit, at least one field programmable gate array, or at least one application specific integrated circuit. At least one of the plurality of modules includes at least another of the plurality of modules such that the acceleration system is structural and nested.

19 Claims, 6 Drawing Sheets

ACCELERATION SYSTEM AND DYNAMIC CONFIGURATION METHOD THEREOF

BACKGROUND OF THE INVENTION

1. Field of the Invention

The present invention relates to an acceleration system and a dynamic configuration method thereof, and more particularly, to an acceleration system and a dynamic configuration method thereof to reduce hardware acceleration costs and improve performance.

2. Description of the Prior Art

In terms of network operations, conventional network devices are classified into radio units (RU), distributed units (DU), central units (CU) or core network servers, but are not limited thereto.

The 5th generation mobile network (5G) employs different hardware acceleration types on different network devices. For example, radio units and distribution units require baseband processing card(s) (such as forward error correction (FEC) accelerator(s)) and security card(s) (such as TLS/IPSec). Central units need security cards (such as TLS/IPSec). As for a core network server, it needs security card(s) (such as TLS accelerator(s)) and Next Gen Firewall card(s) (such as scanning accelerator(s) above Layer 5).

To reduce hardware acceleration costs and improve performance, there is still room for improvement when it comes to hardware acceleration of existing network devices.

SUMMARY OF THE INVENTION

It is therefore a primary objective of the present invention to provide an acceleration system and a dynamic configuration method thereof so as to reduce hardware acceleration costs and improve performance The present invention discloses an acceleration system comprising a plurality of modules, wherein each of the plurality of modules comprises at least one central processing unit, at least one graphics processing unit, at least one field programmable gate array, or at least one application specific integrated circuit, wherein at least one of the plurality of modules comprises at least another of the plurality of modules, such that the acceleration system is structured and nested.

The present invention further discloses a dynamic configuration method for an acceleration system, comprising providing a first information from a recurrent structural causal model based on a first series data, wherein the first series data comprises a first input data at a first time point; and configuring numbers, hierarchies, or types of the plurality of modules of the acceleration system according to the first information to accelerate processing of a second input data at a second time point.

These and other objectives of the present invention will no doubt become obvious to those of ordinary skill in the art after reading the following detailed description of the preferred embodiment that is illustrated in the various figures and drawings.

DETAILED DESCRIPTION

Use of ordinal terms such as "first" and "second" does not by itself connote any priority/precedence/order of one element over another or the chronological sequence in which acts of a method are performed, but are used merely as labels to distinguish one element having a certain name from another element having the same name. Different technical features described in the following embodiments may be combined in various ways if they are not conflict to each other.

Figure 1:
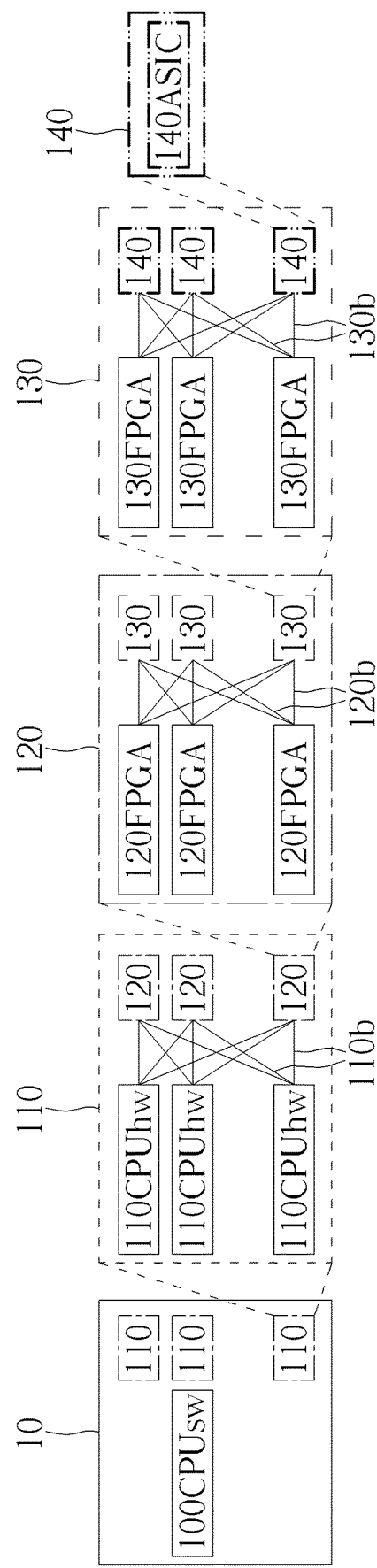
FIG. 1 is a schematic diagram of an acceleration system according to an embodiment of the present invention.

FIG. 1 is a schematic diagram of an acceleration system 10 according to an embodiment of the present invention. The acceleration system 10 may dynamically adjust/configure hardware acceleration type (s) and hierarchy/hierarchies based on input data so as to reduce hardware acceleration cost and improve performance.

One device (such as a network device described above, but not limited thereto) may correspond to one acceleration system 10 of the present invention. Hardware/software of the device (e.g., how input data is divided to be processed by the hardware/software of the device) may be configured according to the acceleration type and hierarchy of the acceleration system 10.

The acceleration system 10 may be structural/structured. As shown in FIG. 1, an acceleration system 10 may include a plurality of modules 110-140 to form a hierarchy or sequence. For example, the acceleration system 10 may be split into at least one module 110 (each in turn may be split into modules further). Each of the modules 110-130 may include at least one module 120-140 respectively: The module 110 may include at least one module 120, and the module 120 may include at least one module 130. In other words, the acceleration system 10 is structural and nested (layer by layer).

A module may include (or correspond to) at least one central processing unit (CPU) 110CPUhw, at least one graphics processing unit (GPU) 120GPU, at least one field programmable gate array (FPGA) 130FPGA, or at least one application specific integrated circuit (ASIC) 140ASIC.

Consequently, in an aspect, in a certain layer, some modules (e.g., one module 110) use slower hardware acceleration of the current layer (e.g., at least one CPU 110CPUhw), and other modules (e.g., another module 110) use faster hardware acceleration of the next layer (e.g., at least one GPU 120GPU). In other words, processing able to be performed by one module may be divided into processing able to be performed by at least two different hardware. For example, processing able to be performed by one module 110 (e.g., tasks of the module 110) may be divided into processing able to be performed by CPU(s) 110CPUhw (e.g., tasks of the CPU(s) 110CPUhw) and processing able to be performed by the GPU(s) 120GPU (e.g., tasks of the GPU(s) 120GPU).

A device receives input data, and the acceleration system 10 may speed up the processing/computation of the input data. For example, the acceleration system 10 may perform pure/sole software processing on the input data (for example, using pure/sole software instruction(s) 110CPUsw of the acceleration system 10 to perform pure/sole software processing) or perform hardware processing on the input data (for example, using hardware acceleration instructions of the CPU 110CPUhw to perform hardware processing).

Input data may be structural/structured. The present invention may adopt clustering algorithm(s) to classify/cluster the structural input data into different groups. The clustering algorithm for grouping purpose may be, for example, K-means algorithm, but is not limited thereto. The number of groups may be related to the total number of the CPU(s) 110CPUhw, the GPU(s) 120GPU, the FPGA(s) 130FPGA, and the ASIC(s) 140ASIC of the acceleration system 10. For example, the number of groups may be less than or equal to the total number of the CPU(s) 110CPUhw, the GPU(s) 120GPU, the FPGA(s) 130FPGA, and the ASIC(s) 140ASIC of the acceleration system 10, but is not limited thereto.

Each group may correspond to one module of the acceleration system 10 respectively; accordingly, the input data may be processed by different modules. For example, part of the input data may be processed by the pure/sole software instruction(s) 110CPUsw of the acceleration system 10. Part of the input data may be corresponding to the module 110 (i.e., assigned to the module 110) and processed by the CPU 110CPUhw. Part of the input data may be corresponding to the module 120 (i.e., assigned to the module 120) and processed by the GPU 120GPU. Part of the input data may be corresponding to the module 130 (i.e., assigned to the module 130) and processed by the FPGA 130FPGA. Part of the input data may be corresponding to the module 140 (i.e., assigned to the module 140) and processed by the ASIC 140ASIC. Since the processing speed of different hardware is different (for example, the GPU 120GPU facilitates the operation acceleration in the field of image processing to accelerate image processing tasks), it may be determine which module and which hardware may be used for acceleration according to the type of input data. That is, the structure of modules of the acceleration system 10 may correspond to the structured information of the input data.

To dynamically adjust/configure the acceleration type and hierarchy in response to structural input data, the acceleration system 10 may dynamically configure the acceleration type and hierarchy of the acceleration system 10 according to a recurrent structural causal model, which is a combination of recurrent neural network (RNN) and structural causal model (SCM). In this manner, the acceleration system 10 may utilize different modules of the acceleration system 10 to process different groups of the input data (i.e., data belonging to the groups of the input data) respectively.

The recurrent structural causal model may be based on causal relation/measure (namely, causality) and statistical relation/measure instead of only statistical relation/measure. Since the recurrent structural causal model may find the structural causal relation of input data, it may determine/deduce optimal acceleration type and hierarchy more accurately, such that the acceleration type and hierarchy of the acceleration system 10 may ensure lower acceleration cost and higher acceleration efficiency.

The recurrent structural causal model may analyze input data at different time points (including the current time point) rather than process only the current input data. As a result, the recurrent structural causal model may provide more accurate predictions, such that the acceleration type and hierarchy of the acceleration system 10 may ensure lower acceleration cost and higher acceleration efficiency at different time points (and at all times).

Figure 2:
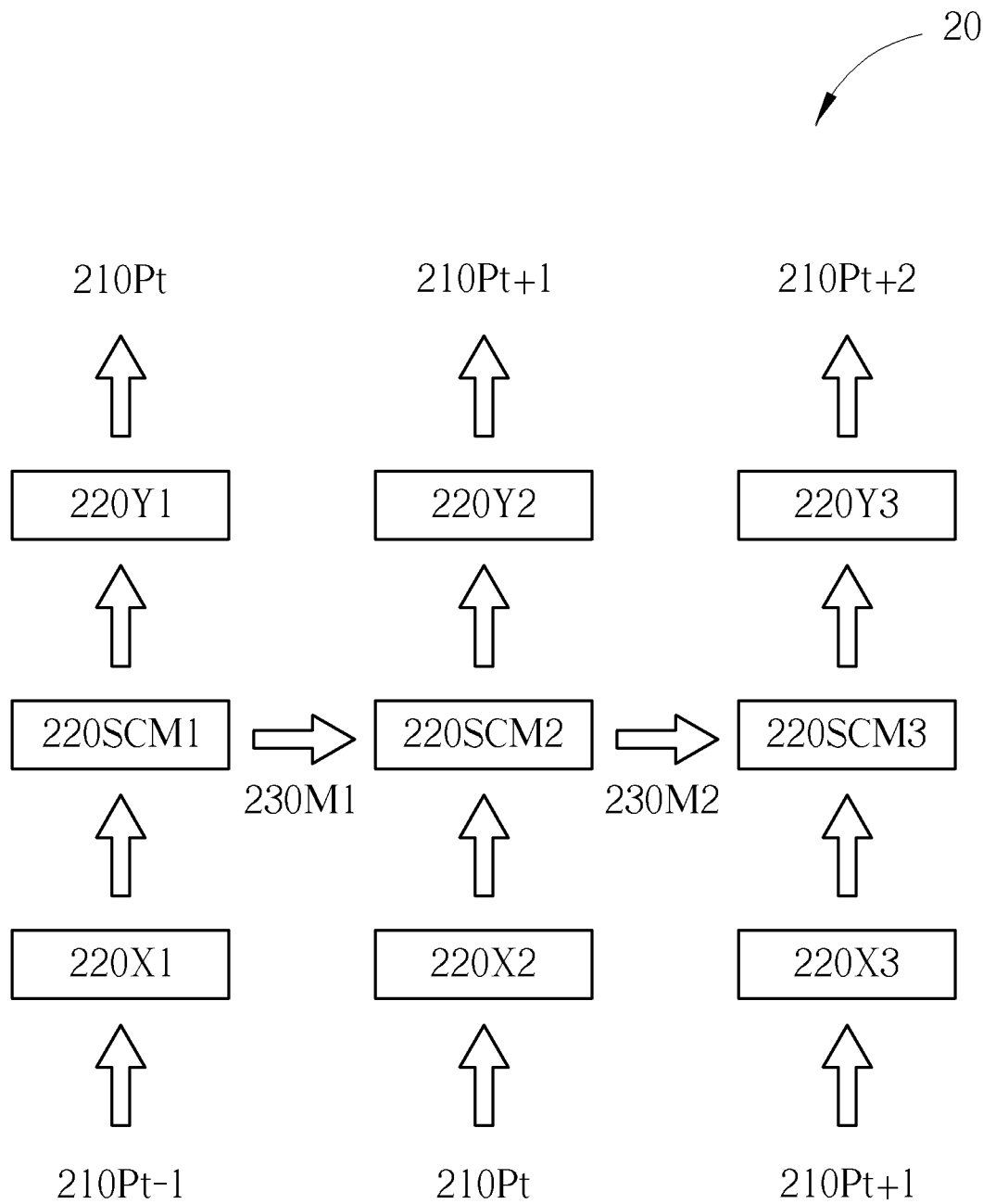
FIG. 2 and FIG. 3 are schematic diagrams of recurrent structural causal models according to embodiments of the present invention.

FIG. 2 is a schematic diagram of a recurrent structural causal model 20 according to an embodiment of the present invention. The recurrent structural causal model 20 may provide structural information to describe the acceleration system 10. The recurrent structural causal model 20 may include input layers 220X1 to 220X3, structural causal layers 220SCM1 to 220SCM3, and output layers 220Y1 to 220Y3. The input layer 220X1 may receive input 210Pt−1, which may be related to input data of the device at a time point t−1. The input layer 220X2 may receive input 210Pt (which is output from the output layer 220Y1), and the input 210Pt may be related to input data of the device at a time point t. The input layer 220X3 may receive input 210Pt+1 (which is output from the output layer 220Y2) and output a label 210Pt+2. The label 210Pt+2 may include information on the acceleration type and hierarchy of the acceleration system 10 at a time point t+1. Therefore, the recurrent structural causal model 20 may dynamically configure the acceleration type and hierarchy of the acceleration system 10 so as to utilize the different modules of the acceleration system 10 to respectively process different groups of the input data.

In one embodiment, the time point t is the current time point. The inputs 210Pt−1 and 210Pt may be related to the input data of the device at the previous time point and the input data of the device at the current time point respectively. The label 210Pt+2 may include information on the acceleration type and hierarchy of the acceleration system 10 at the next time point (i.e., the time point t+1), but is not limited thereto. In other words, the recurrent structural causal model 20 may predict the acceleration type and hierarchy of the acceleration system 10 at the next time point (i.e., the time point t+1) to preconfigure the acceleration type and hierarchy of the acceleration system 10 in advance. Before the input data at the next time point (i.e., the time point t+1) is input to the device, the software/hardware of the device may be preconfigured according to the acceleration type and hierarchy of the acceleration system 10 corresponding to the next time point (i.e., the time point t+1) (considering the input data of the device at the time point t−1 and the input data of the device at the time point t). After the input data at the next time point (i.e., the time point t+1) is input to the device, the hardware and software of the device may be slightly adjusted according to the acceleration type and hierarchy of the acceleration system 10 corresponding to the next time point (i.e., the time point t+1) (or may not be reconfigured because the prediction about the acceleration type and hierarchy is realistic) (considering the input data of the device at the time point t and the input data of the device at the time point t+1).

In another embodiment, the time point t+1 may be the current time point. The inputs 210Pt−1, 210Pt, and 210Pt+1 may be related to the input data of the device at a time point before the previous time point, the input data of the device at the previous time point, and the input data of the device at the current time point respectively. The label 210Pt+2 may include information on the acceleration type and hierarchy of the acceleration system 10 at the current time point.

Figure 3:
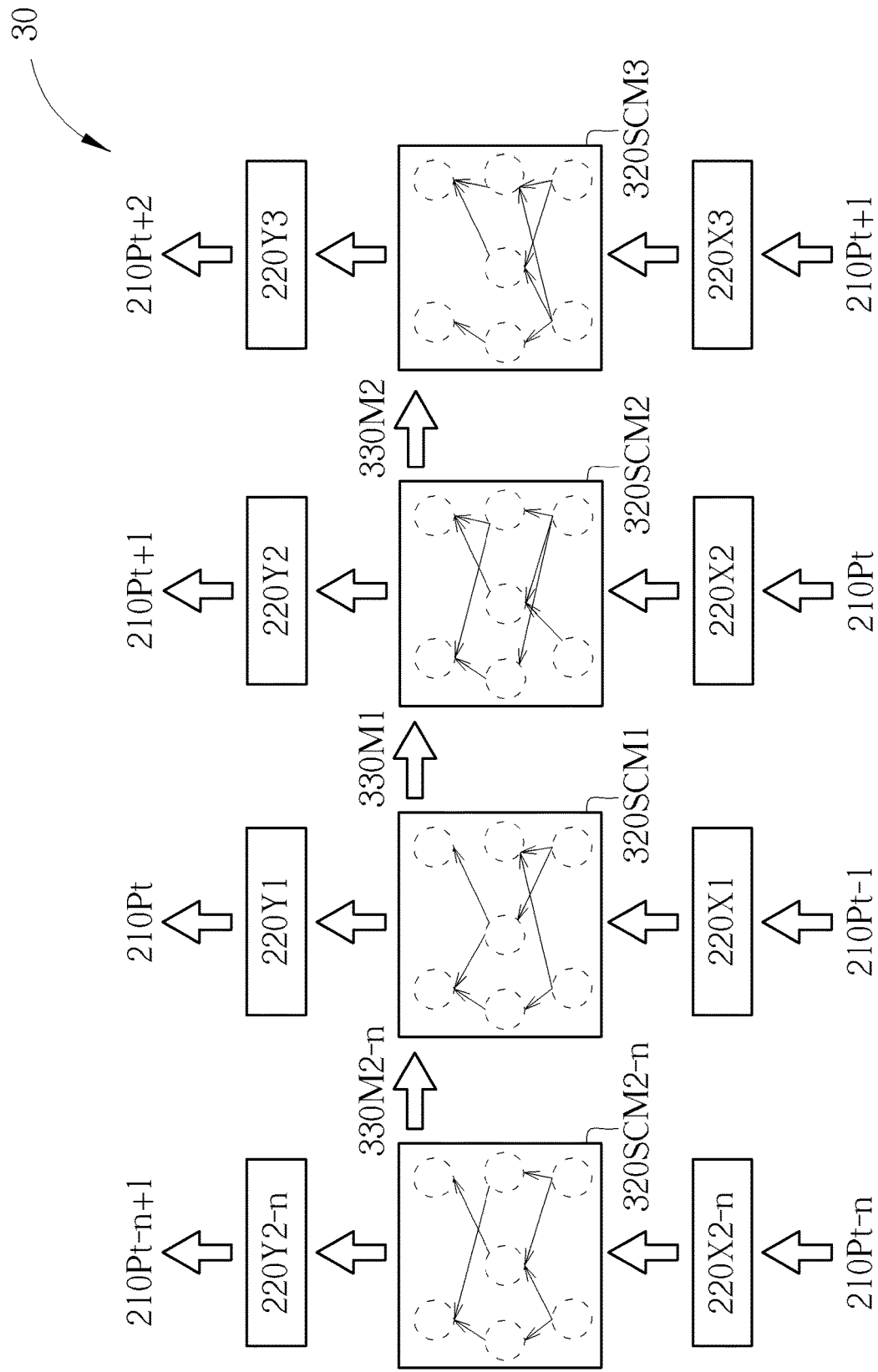

FIG. 3 is a schematic diagram of a recurrent structural causal model 30 according to an embodiment of the present invention. The recurrent structural causal model 30 may include input layers 220X2-*n* to 220X3, structural causal layers 320SCM2-*n* to 320SCM3, and output layers 220Y2-*n* to 220Y3, where n is a positive integer.

In FIG. 3, inputs 210Pt-n to 210Pt may be related to input data of the device at a time point t-n to the input data of the device at the time point t respectively. In one embodiment, one of the inputs 210Pt-n to 210Pt may be the input data of the device at one of the time points t-n to t. In one embodiment, one of the inputs 210Pt-n to 210Pt may be a structural graph related to how the input data is divided into different groups at one of the time points t-n to t.

The inputs 210Pt-1 and 210Pt are related to the input data of the device at the time point t-1 and the input data of the device at the time point t respectively, and hence the input 210Pt-n is at least related to the input data of the device at the time point t-1 and the input data of the device at the time point t. In other words, the recurrent structural causal model 30 may receive time series data (i.e., receive input data at multiple time points).

The structural causal layers 320SCM2-*n* to 320SCM2 may involve causal relation/measure. In FIG. 3, the structural causal layers 320SCM2-*n* to 320SCM2 pass parameters 330M2-*n* to 330M2 to the adjacent structural causal layers 320SCM3-*n* to 320SCM3 respectively; in other words, parameters of a certain time point may be transferred toward the next time point. In one embodiment, the parameters 330M2-*n* to 330M2 may be probabilities instead of weights, but is not limited thereto.

In FIG. 3, the label 210Pt+2 may include information on the acceleration type and hierarchy of the acceleration system 10 at the time point t+1. In one embodiment, the label 210Pt+2 may be a graph. Modeling causality through a graph may bring a way to describe the dynamics of causality. In one embodiment, the label 210Pt+2 may include a structural graph of the acceleration system 10. For example, the label 210Pt+2 may include information about what each module corresponds to, information about the number of the corresponding CPU(s) 110CPUhw, information about the number of the corresponding GPU(s) 120GPU, information about the number of the corresponding FPGA(s) 130FPGA, information about the number of the corresponding ASIC(s) 140ASIC, or information about the connection or nesting methods/results between the modules 110-140. The label 210Pt+2 may include/be structural information (on the acceleration type and hierarchy of the acceleration system 10) with optimal acceleration cost and performance (i.e., lower cost and higher performance).

Figure 4:
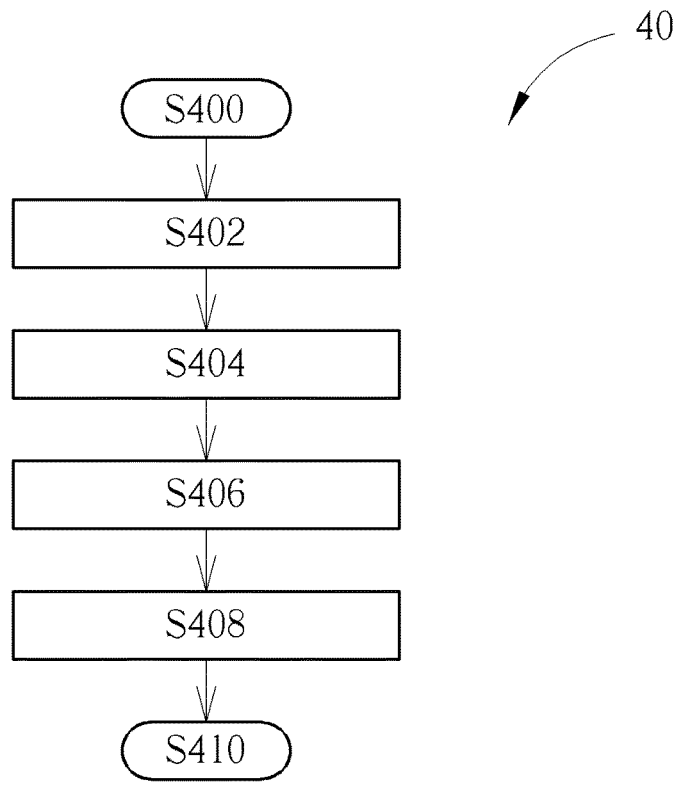
FIG. 4 is a flowchart of an optimization method according to an embodiment of the present invention.

Please refer to FIG. 4. FIG. 4 is a flowchart of an optimization method 40 according to an embodiment of the present invention. The optimization method 40 may be compiled into a code and executed by a processing circuit in a storage circuit. The steps of the optimization method 40 shown in FIG. 4 are as follows:

Step S400: Start.

Step S402: Form a causal graph with a causal discovery algorithm.

Step S404: Verify the causal graph.

Step S406: Train the recurrent structural causal model 20 or 30 with the verified causal graph.

Step S408: Perform prediction/inference with the trained recurrent structural causal model 20 or 30.

Step S410: End.

Specifically, the causal discovery algorithm may extract the causal relation (or causality) of input data. In Step S402, a causal discovery algorithm may be used to convert the input data, which is input to the device, into a causal graph. The causal discovery algorithm may be, for example, fast causal inference (FCI) or fast greedy equivalence search (FGES), but is not limited thereto.

The causal graph generated in Step S402 by using a causal discovery algorithm may be a hypothesized causal relation, and thus the causal graph may have to be verified in Step S404. In one embodiment, the causal graph may be validated using a structural causal model to leave/deduce only correct cause(s) and effect(s) (i.e., correct causality). In another embodiment, a first number (e.g., 20) of samples may be used to verify whether the first variable is a cause of the second variable, and a second number (e.g., 400) of samples may be used to verify whether the second variable is a cause of the first variable. If the second number is much larger than the first number, the first variable may affect the second variable (i.e., may be the cause of the second variable), and the second variable hardly explains anything about the first variable (i.e., may not be the cause of the first variable). An arrow from the first variable to the second variable may be drawn in the causal graph. That is, if the number of samples required by the verification is small, (an arrow in) the direction for the causal graph may be correct. In another embodiment, if there is a ground-truth for the causal graph, the ground-truth may be used to determine whether the causal graph produced in Step S402 is correct.

Step S406 may correspond to a training process. In Step S406, the verified causal graph may be input through the (untrained) recurrent structural causal model 20 or 30. The output of the (untrained) recurrent structural causal model 20 or 30 may be compared with a (known) ground-truth/target. For example, an error (e.g., a mean square error) between the output of the recurrent structural causal model 20 or 30 and the (known) ground-truth may be minimized, such that the output of the recurrent structural causal model 20 or 30 gradually approaches the (known) ground-truth to optimize parameters. The parameters may be re-evaluated/update and optimized to train the recurrent structural causal model 20 or 30, thereby completing the training. The (known) ground-truth may correspond/refer to a target output of lower cost and higher performance.

Step S408 may correspond to an inference/prediction process, which applies/uses knowledge from the (trained) recurrent structural causal model 20 or 30 to infer/predict/estimate a result. In Step S408, the (trained) recurrent structural causal model 20 or 30 may be used for prediction. When the (unknown) input data, which is to be interpreted/recognized, is input through the (trained) recurrent structural causal model 20 or 30, the (trained) recurrent structural causal model 20 or 30 may perform inference/prediction on the (unknown) input data according to the (optimized) parameters, to generate the prediction (i.e., the label 210Pt+2). The prediction (i.e., the label 210Pt+2) output from the recurrent structural causal model 20 or 30 may include information about the acceleration type and hierarchy of the acceleration system 10. The recurrent structural causal model 20 or 30 may (help) dynamically configure the acceleration type and hierarchy of the acceleration system 10, such that different modules of the acceleration system 10 are used to process different groups of the input data respectively.

In one embodiment, one of Steps S402 to S408 may be optional and thus omitted.

Figure 5:
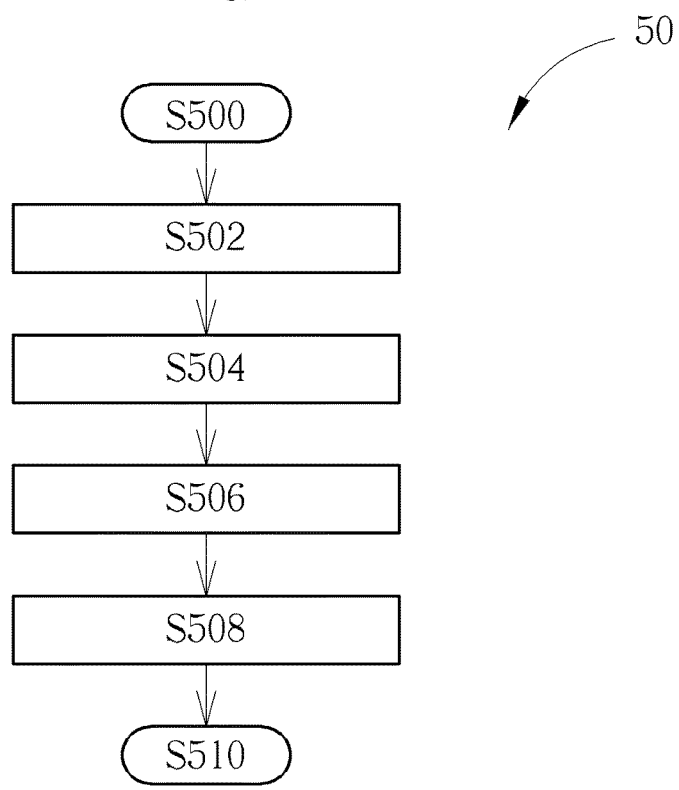
FIG. 5 is a flowchart of a dynamic configuration method according to an embodiment of the present invention.

Please refer to FIG. 5. FIG. 5 is a flowchart of a dynamic configuration method 50 according to an embodiment of the present invention. The dynamic configuration method 50 may be compiled into a code and executed by a processing circuit in a storage circuit. The steps of the dynamic configuration method shown in FIG. 5 are as follows:

Step S500: Start.

Step S502: (The recurrent structural causal model 20 or 30) provides a first information according to a first series data, wherein the first series data includes a first input data at a first time point.

Step S504: Configure number(s), type(s), or hierarchy/hierarchies of the modules 110-140 of the acceleration system 10 according to the first information to speed up the processing of a second input data at a second time point.

Step S506: (The recurrent structural causal model 20 or 30) provides a second information according to a second series data, wherein the second series data includes a second input data at the second time point.

Step S508: Configure the number(s), type(s), or hierarchy/hierarchies of the modules 110-140 of the acceleration system 10 according to the second information to speed up the processing of a fourth input data at a fourth time point.

Step S510: End.

According to the dynamic configuration method 50, the acceleration system 10 may be used to accelerate the processing/computation of the first input data, the second input data, or the fourth input data. The number(s), type(s), or hierarchy/hierarchies of the modules 110-140 of the acceleration system 10 may be dynamically configured/adjusted according to the recurrent structural causal model 20 or 30.

Specifically, in Steps S502 and S506, as set forth above, the input of the recurrent structural causal model 20 or 30 may be time series data of multiple time points. For example, the first series data may include the first input data at the first time point and a third input data at a third time point, which is earlier than the first time point. Similarly, the second series data may include the second input data at the second time point and the first input data at the first time point, which is earlier than the second time point. A fourth series data may include the fourth input data at the fourth time point and the second input data at the second time point, which is earlier than the fourth time point.

The first information, which is output by the recurrent structural causal model 20 or 30, may correspond to the second time point, and the first information may include the number(s), type(s), or hierarchy/hierarchies of the modules 110-140 of the acceleration system 10 corresponding to the second time point. Similarly, the second information, which is output by the recurrent structural causal model 20 or 30, may correspond to the fourth time point, and the second information may include the number(s), type(s), or hierarchy/hierarchies of the modules 110-140 of the acceleration system 10 corresponding to the fourth time point. The second time point is earlier than the fourth time point. Therefore, the acceleration system 10 may be dynamically configured according to the first information or the second information. In one embodiment, hierarchy may relate to connection relation/methods/results, hierarchical relation/methods/results, or nesting relation/methods/results of the modules 110-140. In one embodiment, a type may relate to the kind of circuit (such as a CPU or a GPU).

In Steps S504 and S508, as set forth above, the first input data, the second input data, or the third input data may be divided into groups, and these groups correspond to the modules 110-140 of the acceleration system 10 respectively. The modules 110-140 of the acceleration system 10 respectively process the corresponding groups. For example, referring back to FIG. 1, the module 110 includes the module 120. Therefore, the module 110 may perform different processing: Processing able to be performed by one module 110 may be divided into processing able to be performed by the CPU (s) 110CPUhw and processing able to be performed by the GPU(s) 120GPU. A first group of these groups may, for example, correspond to the module 110. A first group input data within the input data (such as the second input data) may be assigned to, for example, the first group. Part of the first group input data may be processed by one module 110; part of the first group input data may be processed by one module 120. The processing speed of the module 110 may be faster than the processing speed of the module 120.

In one embodiment, one of Steps S502 to S508 may be optional and thus omitted.

Figure 6:
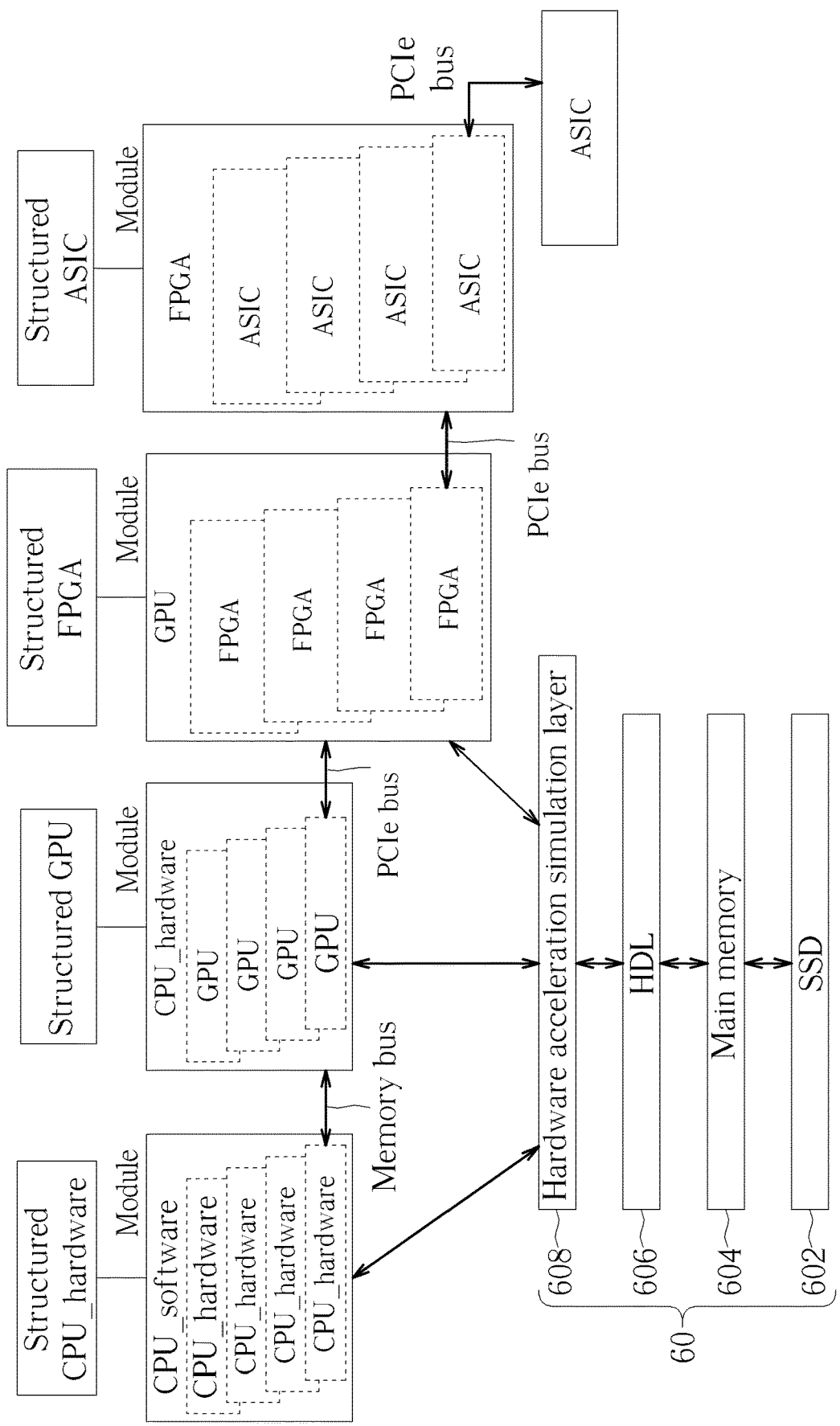
FIG. 6 is a schematic diagram of an implementation method according to an embodiment of the present invention.

FIG. 6 is a schematic diagram of an implementation method 60 according to an embodiment of the present invention.

In one embodiment, each of the modules 110-140 may be described by a hardware description language (HDL) 606. After hardware design is performed using the HDL 606, integrated circuit(s) may be manufactured or programmed for use accordingly (namely, by drawing layout and then taping out). The HDL 606 may be, for example, VHDL or Verilog, but is not limited thereto.

The HDL 606 inside a file on a solid-state disk (SSD) 602 may be mapped to a main memory 604 and read by the hardware acceleration simulation layer 608 to realize the acceleration system 10.

Accordingly, the acceleration system 10 may correspond to a circuit board with CPU(s) 110CPUhw, GPU(s) 120GPU, FPGA(s) 130FPGA, and ASIC (s) 140ASIC. The CPU 110CPUhw may support pure/sole software instruction(s) 110CPUsw and hardware acceleration instruction(s). The acceleration system 10 may include a firmware known as a combination of a hardware device and computer instructions and data that reside as read-only software on the hardware device or an electronic system. How the CPU(s) 110CPUhw, the GPU(s) 120GPU, the FPGA(s) 130FPGA, and the ASIC(s) 140ASIC are physically arranged on the circuit board may not be adjustable/reconfigurable over time; however, how the CPU(s) 110CPUhw, the GPU(s) 120GPU, the FPGA(s) 130FPGA, and the ASIC(s) 140ASIC are structured/nested to form/constitute/construct the acceleration system 10 may be adjustable/reconfigurable over time. As a result, the acceleration type and hierarchy of the acceleration system 10 may be dynamically configured over time, and input data is processed by the software and hardware of the device in a manner to cut costs and improve performance.

The acceleration system 10 of the present invention is an exemplary embodiment of the present invention, and those skilled in the art may readily make various substitutions and modifications. For example, as shown in FIG. 1 and FIG. 6, a CPU 110CPUhw and a GPU 120GPU may be connected by a bus 110b, which may be a memory bus. A GPU 120GPU and an FPGA 130FPGA may be connected by a bus 120b. An FPGA 130FPGA and an ASIC 140ASIC may be connected by a bus 130b. The buses 120b and 130b may be PCI Express (PCIe) buses respectively, but is not limited to.

Figure 7:
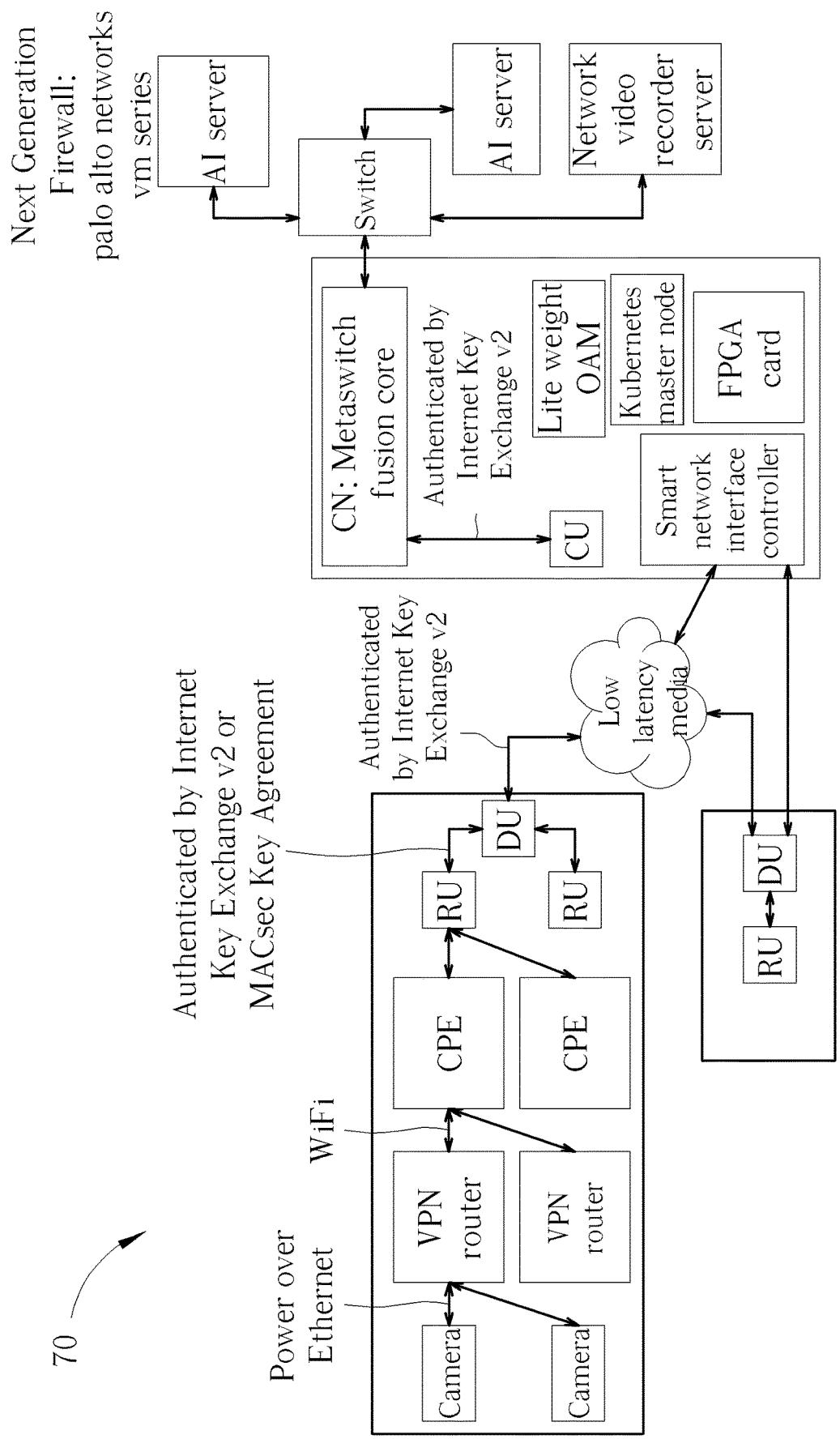
FIG. 7 is a schematic diagram of a communication system according to an embodiment of the present invention.

FIG. 7 is a schematic diagram of a communication system 70 according to an embodiment of the present invention.

The device of the present invention may be a network device such as a radio unit RU, a distributed unit DU, a central unit CU, or a core network server shown in FIG. 7, but is not limited to this.

In the 5th generation mobile network (5G), the type of input data may be different for different network devices. Take uplink as an example: Input data for a radio unit RU is singly encrypted and demodulated. Input data for a distribution unit DU is doubly encrypted and modulated. Input data for a central unit CU is doubly encrypted and demodulated. Input data for a core network server is singly encrypted and demodulated. Since each type of network device has its own kind of input data, different network devices may require different acceleration types and hierarchies and thus correspond to different acceleration systems 10 respectively. The recurrent structural causal model 20 or 30 is able to ensure that every network device would have appropriate acceleration type and hierarchy.

In another aspect, the types of input data for one network device at different time points may be the same, although each type of network device has its own kind of input data. The types of input data for a network device may be related to a source device of the input data. For example, in FIG. 7, the source device of the input data is a camera. If the source device is changed to a wearable device, the type of the input data may change, and the acceleration type and hierarchy of the acceleration system 10 corresponding to the input data may change accordingly.

To sum up, the acceleration system of the present invention may provide hardware acceleration types and hierarchy/hierarchies based on user scenarios dynamically, so as to reduce hardware acceleration costs and optimize performance. The predictions of the recurrent structural causal model of the present invention may include the acceleration type and hierarchy of the acceleration system with optimal cost and performance. The recurrent structural causal model of the present invention may be trained by historical time series data to predict at any time point for a specific input data which (acceleration type and hierarchy of the) acceleration system would be best fit in terms of cost reduction and performance optimization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An acceleration system, comprising:
  a plurality of modules, wherein each of the plurality of modules comprises at least one central processing unit, at least one graphics processing unit, at least one field programmable gate array, or at least one application specific integrated circuit,
  wherein at least one of the plurality of modules comprises at least another of the plurality of modules, such that the acceleration system is structured and nested,
  wherein numbers, hierarchies, or types of the plurality of modules of the acceleration system is dynamically configured according to a recurrent structural causal model.

2. The acceleration system of claim 1, wherein an input data is divided into a plurality of groups, the plurality of groups correspond to the plurality of modules of the acceleration system respectively, and the plurality of modules of the acceleration system process the plurality of groups corresponding to the plurality of modules respectively.

3. The acceleration system of claim 2, wherein the input data is divided into the plurality of groups according to a clustering algorithm.

4. The acceleration system of claim 2, wherein a first module within the plurality of modules comprises a second module within the plurality of modules, a first group within the plurality of groups corresponds to the first module, a first group input data within the input data is assigned to the first group, part of the first group input data is processed by the first module, and part of the first group input data is processed by the second module.

5. The acceleration system of claim 4, wherein a processing speed of the first module is faster than a processing speed of the second module.

6. The acceleration system of claim 1, wherein the acceleration system is used to accelerate processing of an input data, an input of the recurrent structural causal model is related to the input data at a first time point, the recurrent structural causal model outputs information corresponding to a second time point, the information comprises the numbers, hierarchies, or types of the plurality of modules, and the acceleration system is dynamically configured according to the information.

7. The acceleration system of claim 6, wherein the input of the recurrent structural causal model is a time series data, the time series data comprises the input data at the first time point and a third input data at a third time point, and the third time point is earlier than the first time point.

8. The acceleration system of claim 7, wherein the second time point is later than the first time point.

9. The acceleration system of claim 1, wherein a causal graph is generated and verified with a causal discovery algorithm, and the recurrent structural causal model is trained using the verified causal graph.

10. A dynamic configuration method for an acceleration system, comprising:
  providing a first information from a recurrent structural causal model based on a first series data, wherein the first series data comprises a first input data at a first time point; and
  configuring numbers, hierarchies, or types of the plurality of modules of the acceleration system according to the first information to accelerate processing of a second input data at a second time point.

11. The dynamic configuration method according to claim 10, wherein
  each of a plurality of modules of the acceleration system comprises at least one central processing unit, at least one graphics processing unit, at least one field programmable gate array, or at least one application specific integrated circuit,
  wherein at least one of the plurality of modules comprises at least another of the plurality of modules, such that the acceleration system is structured and nested.

12. The dynamic configuration method of claim 10, wherein the second input data is divided into a plurality of groups, the plurality of groups correspond to the plurality of modules of the acceleration system respectively, and the plurality of modules of the acceleration system process the plurality of groups corresponding to the plurality of modules respectively.

13. The dynamic configuration method of claim 12, the second input data is divided into the plurality of groups according to a clustering algorithm.

14. The dynamic configuration method of claim 12, wherein a first module within the plurality of modules comprises a second module within the plurality of modules, a first group within the plurality of groups corresponds to the first module, a first group input data within the second input data is assigned to the first group, part of the first group input data is processed by the first module, and part of the first group input data is processed by the second module.

15. The dynamic configuration method of claim 14, wherein a processing speed of the first module is faster than a processing speed of the second module.

16. The dynamic configuration method as described in claim 10, further comprising:

providing a second information from the recurrent structural causal model based on a second series data, wherein the second series data comprises the second input data at the second time point; and configuring the numbers, hierarchies, or types of the plurality of modules of the acceleration system according to the second information to accelerate processing of a fourth input data at a fourth time point.

17. The dynamic configuration method of claim 16, wherein the first series data comprises the first input data at the first time point and a third input data at a third time point, the second series data comprises the first input data at the first time point and the second input data at the second time point, and the third time point is earlier than the first time point.

18. The dynamic configuration method of claim 16, wherein the first information comprises the numbers, hierarchies, or types of the plurality of modules corresponding to the second time point, and the second information comprises the numbers, hierarchies, or types of the plurality of modules corresponding to the fourth time point.

19. The dynamic configuration method of claim 10, wherein a causal graph is generated and verified with a causal discovery algorithm, and the recurrent structural causal model is trained using the verified causal graph.

\* \* \* \* \*